Oct. 27, 1970  S. GOLDSCHMIED  3,535,769

FORMATION OF SOLDER JOINTS ACROSS GAPS

Original Filed Oct. 25, 1966

INVENTOR.
SANDOR GOLDSCHMIED
BY
Christie, Parker & Hale
ATTORNEYS

United States Patent Office
3,535,769
Patented Oct. 27, 1970

3,535,769
FORMATION OF SOLDER JOINTS ACROSS GAPS
Sandor Goldschmied, Anaheim, Calif., assignor to Burroughs Corporation, Detroit, Mich., a corporation of Michigan
Continuation of application Ser. No. 589,334, Oct. 25, 1966. This application May 23, 1969, Ser. No. 828,443
Int. Cl. B23k 31/02
U.S. Cl. 29—472.1                                    10 Claims

---

ABSTRACT OF THE DISCLOSURE

A method is disclosed for forming solder joints across gaps by bridging the gap with a material that does not melt when subjected to soldering temperatures. Various structures comprising layers of bridging material and solder physically held together are disclosed for carrying out the method. Methods for fabricating the structures are also disclosed.

---

This is a continuation of application Ser. No. 589,334, filed Oct. 25, 1966.

This invention relates to the formation of solder joints and, more particularly, to techniques especially well suited for establishing solder joints across gaps.

In the electrical and electronic industries, it is frequently necessary to establish a solder joint between two conductors across a gap. Since the development of printed circuit boards and microminiature circuitry, the need for better techniques to form solder joints across large gaps has become even more apparent. Present attempts to form good solder joints across large gaps, however, have not proved very satisfactory. The generally accepted technique is to use a so-called solder preform. When establishing a solder joint between a connector pin and a conductor surrounding a hole in a circuit board through which the pin passes, for example, solder is rolled into a flat ribbon and a hole the size of the pin is punched out of the ribbon. Then the solder ribbon or preform is placed around the pin. As a result, the solder preform extends across the gap between the pin and the hole in the circuit board. Upon application of heat to establish the connection, however, the solder melts, loses its form, and drips through the gap, thereby forming a poor joint.

According to one aspect of the invention, a material that does not melt when exposed to soldering temperatures is used to bridge a gap across which a solder joint is to be established. A bridging material is selected to which melted solder adheres well. Heat is applied to solder in contact with the bridging material. The solder melts and, supported by the unmelted bridging material, forms a joint between the two conductors separated by the gap. In addition to supporting the solder, and thereby preventing it from dripping through the gap, the bridging material provides a surface along which the solder spreads to the conductors. Preferably, the bridging material is itself an electrical conductor, such as oxide-free copper, in which case, the quality of the joint across the gap is further enhanced. Like solder used across a gap, the bridgeing material can also be preformed.

In another aspect, the invention contemplates various structures comprising layers of bridging material and solder physically held together. The bridging material and the solder may be in indirect physical contact separated by a layer of flux or in direct physical contact. Furthermore, a plurality of layers of solder and/or bridging material may be employed in the structure.

According to another aspect of the invention, a structure comprising a layer of bridging material sandwiched between two layers of solder is made from a cylindrical solder ribbon having a bridging material implanted in its center. The temperature of the cylindrical ribbon is first brought to the point where the malleability of the solder and the bridging material is substantially the same and the cylindrical ribbon is then rolled to form a flat ribbon having a layer of bridging material sandwiched between two layers of solder.

These and other features of the invention are considered further in the following detailed description taken in conjunction with the drawings, in which.

Figure 1:
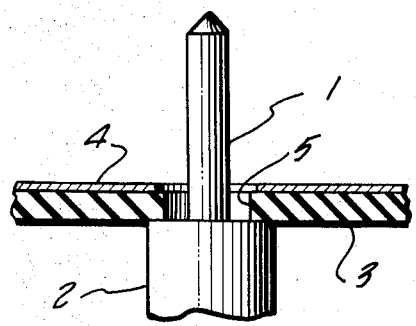
FIG. 1 is a side elevation view partially in section of a connector pin extending through a hole in a conductive plate.

FIG. 1 shows a typical situation in which a solder connection is to be established across a large gap. A connector pin 1 is attached to a connector body 2. An insulator 3 has a conductive ground plate 4 extending along its upper surface. Pin 1 is inserted through an opening 5 in insulator 3 for the purpose of grounding pin 1 to plate 4. The gap existing between pin 1 and plate 4 makes it difficult, and often impossible, to establish satisfactory solder connections by use of existing techniques in such a situation.

Figure 2A:
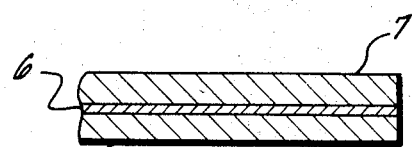
FIGS. 2A through 2D are various structures of solder and bridging material physically held together.
Figure 2B:
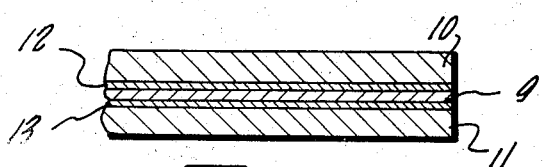
Figure 2C:
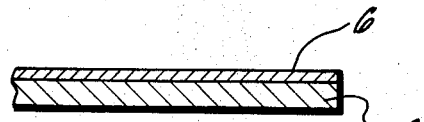
Figure 2D:
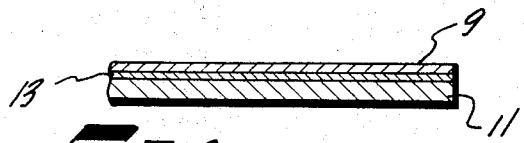

In FIG. 2A, a layer 6 of material is sandwiched between, and physically held to, layers 7 and 8 of solder. The material of layer 6 has a melting point well above that of the solder so it remains in solid form when exposed to soldering temperatures and also adheres to the melted solder. The material of layer 6 is preferably, but not necessarily, an electrical conductor such as oxide-free copper. In such case, it can itself form part of the electrically conducting joint. In FIG. 2B, a layer 9 of bridging material is held to layers 10 and 11 of solder by layers 12 and 13 of flux, respectively. As illustrated by FIGS. 2C and 2D, a single layer of solder held to a single layer of bridging material is sufficient for some applications.

Figure 3:
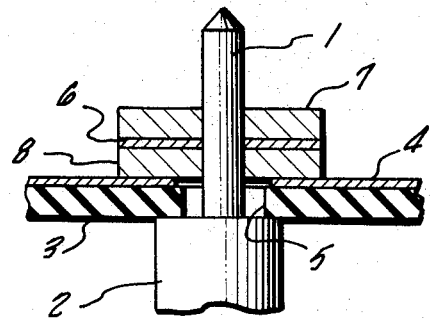
FIG. 3 is a side elevation view in section of a connector pin extending through a hole in a conductive plate and the structure of FIG. 2A positioned as a preform across the gap between the connector pin and the plate.

Reference is now made to FIG. 3, in which the components of FIG. 1 are shown with the structure of FIG. 2A. A hole corresponding to the diameter of connector pin 1 is punched in the structure of FIG. 2A and the resulting preform is fitted over pin 1. As a result, upon the application of heat to this preform, the solder melts and spreads to form a joint between plate 4 and pin 1 without dripping through the gap. If the material of layer 6 is a conductor, an even better electrical connection is formed between pin 1 and plate 4. Any of the structures shown in FIGS. 2B, 2C, or 2D could also be employed in the manner illustrated in FIG. 3.

Instead of employing a structure of a layer of bridging material physically held to a layer of solder, the two can be separated. The bridging material is placed across the gap, and the solder is brought into contact with the bridging material and melted.

Figure 4:
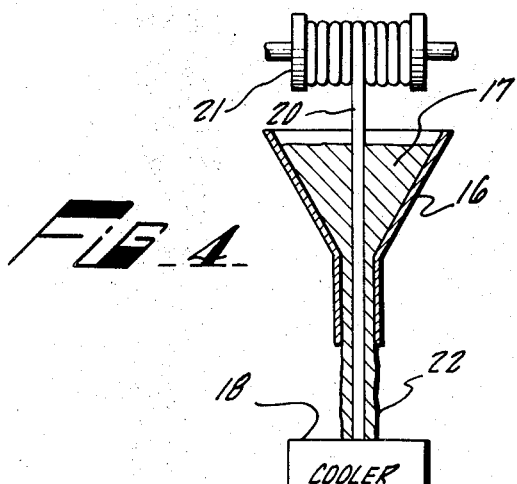
FIG. 4 is a schematic diagram of a process for making a flat ribbon having a layer of bridging material sandwiched between two layers of solder.

FIG. 4 represents a method for producing the structure of FIG. 2A. Melted solder 17 is poured into a funnel 16. A wire 20 of the bridging material is also fed from a spool 21 through the center of funnel 16 so that a cylindrical ribbon 22 of solder having a copper center is formed at the throat of funnel 16. Wire 20 is supported by means not shown in a position coincident with the axis of funnel 16. Ribbon 22 is reduced by a cooler 18 to a temperature at which the solder and the bridging material have substantially the same malleability. In the case of oxide-free copper and a 63% tin-37% lead alloy solder, this would be about −43° F. The cooled wire is then applied to rollers 19, which produce a flat ribbon comprising a layer of the bridging material sandwiched between two layers of solder. Typical dimensions for the flat ribbon are a width of 150 mils and a thickness of 30 mils.

The structure of FIG. 2B can be fabricated by pouring flux into funnel 16 between solder 17 and wire 20.

The structure of FIGS. 2B and 2D can be fabricated by placing a coating of melted flux over the surface of a layer of the bridging material, placing a layer of solder thereon, and applying pressure to the arrangement by means of rollers. Thus, the flux serves as an adhesive to hold the solder and bridging material together in indirect contact.

The structures of FIGS. 2A and 2C can be fabricated by a electroplating a sheet of bridging material with solder.

1. A method of forming a solder joint across the gap between a conductor pin and a conductive plate with a hole that surrounds the pin, the method comprising the steps of:
bridging the gap between the pin and the plate with a material that has a higher melting point than solder, said material defining a surface along which melted solder can flow between the pin and the plate; and
applying heat to solder in contact with the bridging material so as to melt the solder and allow it to flow along said surface to form a solder joint between plate and pin, the temperature of heat being above the melting point of the solder and below the melting point of the bridging material.

2. The method of claim 1, in which the bridging material is an electrical conductor.

3. The method of claim 2, in which the bridging material completely surrounds the pin.

4. The method of claim 3, in which the solder is physically held to the bridging material and completely surrounds the pin before the appllication of heat to the solder.

5. The method of claim 1, in which the bridging material completely surrounds the pin.

6. The method of claim 1, in which the solder is physically held to the bridging material before the application of heat to the solder.

7. A method of forming a solder joint comprising the steps of:
placing a connector pin in a hole through a conductive plate, the hole being substantially larger than the pin so as to form a substantial gap between the pin and the plate;
punching a hole corresponding to the diameter of the pin in a structure comprising a sheet of solder physically held to a sheet of material that has a higher melting point than the solder and adheres well to the solder;
fitting the pin into the hole in the structure such that the structure bridges the gap between the pin and the plate; and
applying heat to the structure so as to melt the solder to form an electrical connection between plate and pin without melting the material to which the solder is held.

8. The method of claim 7, in which the material to which the solder is held is an electrical conductor.

9. The method of claim 7, in which the structure has a sheet of solder physically held to each side of the sheet of material.

10. The method of claim 7, in which the structure has a sheet of flux held between the sheet of solder and the sheet of material.

References Cited

UNITED STATES PATENTS

| 185,339 | 12/1876 | Mackey | 29—196.4 X |
|---|---|---|---|
| 2,530,552 | 11/1950 | Stoddard | 29—501 X |
| 3,006,069 | 10/1961 | Rhodes et al. | 29—498 X |
| 3,089,449 | 5/1963 | Gutbier | 29—34 |
| 3,266,125 | 8/1966 | Tobolski | 29—577 X |
| 3,451,836 | 6/1969 | Spooner et al. | 29—502 X |

JOHN F. CAMPBELL, Primary Examiner

V. A. D. PALMA, Assistant Examiner

U.S. Cl. X.R.

29—498, 501; 228—56